US008735783B2

(12) United States Patent
Lovens et al.

(10) Patent No.: US 8,735,783 B2
(45) Date of Patent: May 27, 2014

(54) ELECTRIC INDUCTION HEATING AND STIRRING OF AN ELECTRICALLY CONDUCTIVE MATERIAL IN A CONTAINMENT VESSEL

(75) Inventors: Jean Lovens, Embourg (BE); Michel Fontaine, Aywaille (BE); Bernard M. Raffner, Moorestown, NJ (US)

(73) Assignee: Inductotherm Corp., Rancocas, NJ (US)

( * ) Notice: Subject to any disclaimer, the term of this patent is extended or adjusted under 35 U.S.C. 154(b) by 868 days.

(21) Appl. No.: 12/819,220

(22) Filed: Jun. 20, 2010

(65) Prior Publication Data

US 2011/0011750 A1    Jan. 20, 2011

Related U.S. Application Data

(60) Provisional application No. 61/218,964, filed on Jun. 21, 2009.

(51) Int. Cl.
*H05B 6/36* (2006.01)
*B23K 13/01* (2006.01)
*H05B 6/34* (2006.01)
*H05B 6/22* (2006.01)

(52) U.S. Cl.
USPC ............ 219/672; 219/609; 373/146; 373/152

(58) Field of Classification Search
USPC ......... 219/600, 601, 602, 618, 635, 646, 647, 219/648, 672, 674, 675, 676, 677, 605, 219/609; 373/7, 138, 139, 146, 147, 148, 373/151, 152, 159, 160–163; 266/233, 234, 266/237
See application file for complete search history.

(56) References Cited

U.S. PATENT DOCUMENTS

| 1,688,220 | A | | 10/1928 | Wyatt | |
| 2,647,304 | A | * | 8/1953 | Cook et al. | 427/434.5 |
| 2,783,086 | A | * | 2/1957 | Brennan | 373/146 |
| 3,330,900 | A | * | 7/1967 | Taylor et al. | 373/146 |
| 3,779,056 | A | * | 12/1973 | Padjen et al. | 118/429 |
| 3,887,721 | A | | 6/1975 | Schwieterman | |
| 5,354,970 | A | | 10/1994 | Knupfer | |
| 5,787,110 | A | | 7/1998 | Fishman et al. | |
| 6,391,247 | B1 | * | 5/2002 | Heine et al. | 266/234 |
| 6,770,140 | B2 | * | 8/2004 | Ishii et al. | 118/602 |
| 2004/0028111 | A1 | | 2/2004 | Fishman et al. | |

FOREIGN PATENT DOCUMENTS

| JP | 59-145772 A | 8/1984 |
| JP | 2009-024941 A | 2/2009 |
| WO | 02/071809 A1 | 9/2002 |

* cited by examiner

*Primary Examiner* — Henry Yuen
*Assistant Examiner* — Hung D Nguyen
(74) *Attorney, Agent, or Firm* — Philip O. Post

(57) ABSTRACT

Apparatus and method are provided for electric induction heating and/or stirring of a molten electrically conductive composition in a containment vessel with the apparatus being removably insertable in the molten composition. An induction coil embedded in refractory or a coating is submerged in the composition and used to heat and/or stir the molten composition either externally or internally to the refractory or coating.

11 Claims, 17 Drawing Sheets

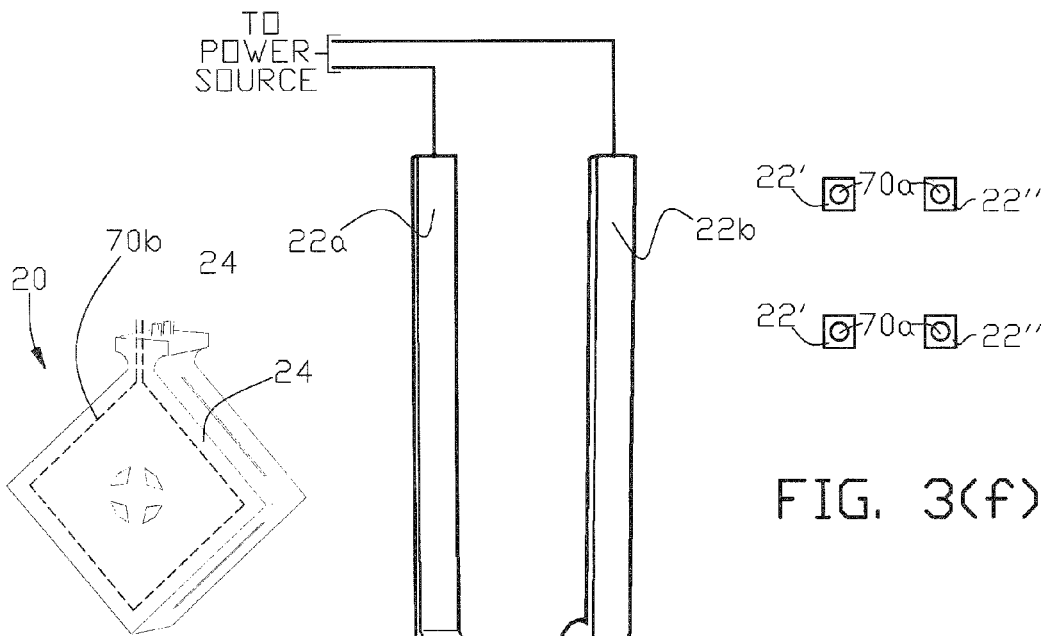
FIG. 3(f)
FIG. 3(g)
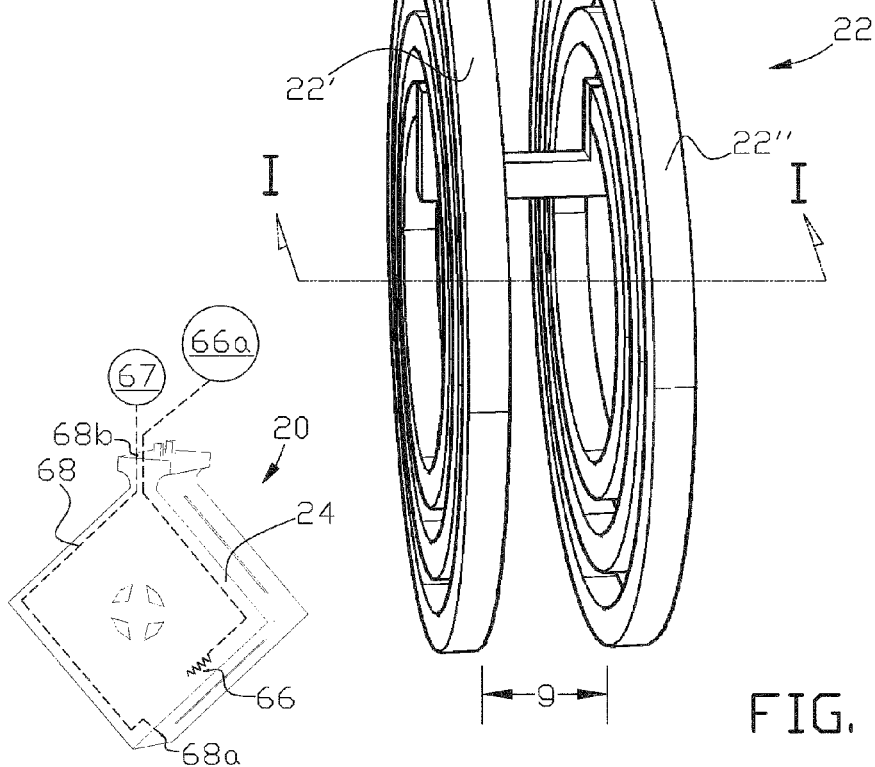
FIG. 3(b)
FIG. 3(h)

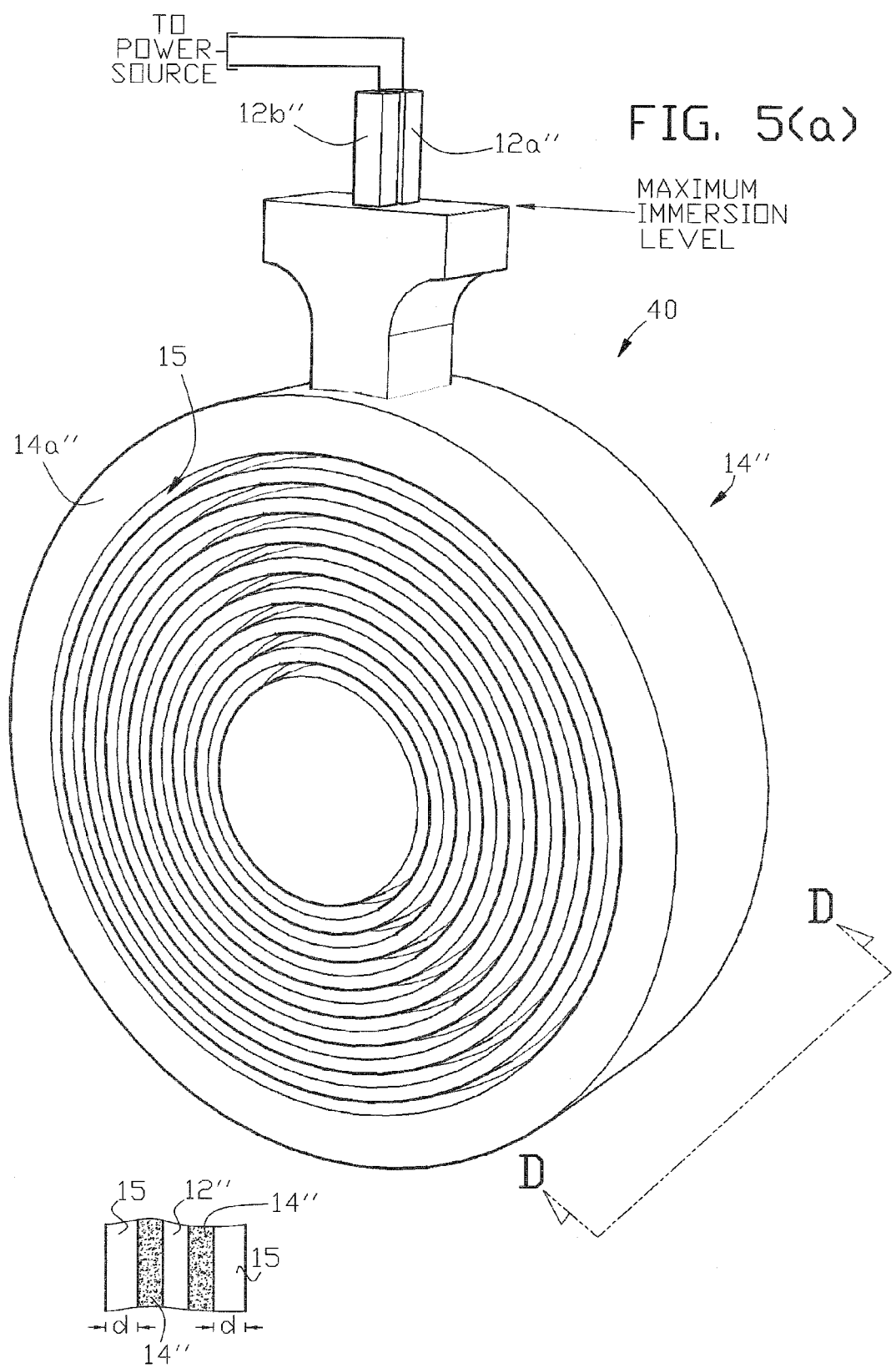

ELECTRIC INDUCTION HEATING AND STIRRING OF AN ELECTRICALLY CONDUCTIVE MATERIAL IN A CONTAINMENT VESSEL

CROSS REFERENCE TO RELATED APPLICATIONS

This application claims the benefit of U.S. Provisional Application No. 61/218,964, filed Jun. 21, 2009, which is hereby incorporated by reference in its entirety.

FIELD OF THE INVENTION

The present invention relates generally to electric induction heating or stirring of an electrically conductive material in a containment vessel, and in particular, to such heating or stirring when accomplished with an electric inductor assembly that can be removably inserted in the containment vessel.

BACKGROUND OF THE INVENTION

Containers for holding hot electrically conductive materials over an extended period of time at temperatures above liquidus are used in various industrial applications. For example a steel workpiece or article can be dipped into a container holding a hot molten zinc composition to zinc-coat the article in a galvanizing process. The container is generally referred to as a coating pot. The steel workpiece or article dipped into the molten zinc alloy composition may be an individual article, or a continuously moving workpiece, such as a sheet, strip, tube, pipe or a continuous workpiece in other form. Other examples of coating compositions may be zinc alloys or aluminum alloys, such as aluminum-magnesium compositions or zinc-aluminum compositions. The hot molten zinc composition remains in the coating pot for an extended period of time, and must be kept within a nominal temperature range while steel articles are sequentially dipped into the pot, or while a continuous workpiece moves through the pot. While thermal insulation of the pot itself helps in retaining heat, pot insulation alone is generally insufficient to maintain the molten zinc composition at a desired temperature.

Various techniques are used to heat electrically conductive compositions in a coating pot. U.S. Pat. No. 5,354,970 A1 and U.S. Pat. No. 5,787,110 A1 disclose zinc coating pots with one or more coreless electric induction furnaces disposed on the walls of the furnaces. However this results in generally localized heating and molten metal movement in the pots since the coreless electric induction furnaces are stationary and wall mounted relative to the zinc coating material in the pot. Another approach is to use a channel electric induction furnace in the pot as disclosed, for example, in U.S. Pat. No. 1,688,220 A1. Basically a channel induction furnace comprises a solenoidal induction coil wound around magnetic material that is inserted into a tubular volume bounded by refractory material near the bottom region of a coating pot. The channel between the tubular volume's refractory material and the bottom refractory of the coating pot form a flow path for the molten composition (melt) in the pot. Alternating current flow through the solenoidal induction coil creates an electromagnetic field in the channel. The alternating magnetic (flux) field inductively heats the melt in the channel, and applies a magnetic force to the melt that moves the melt through the channel. Therefore a channel furnace provides a combination of induced heating and electromagnetic stirring of the melt. However, one of the disadvantages of a channel furnace is that it complicates the design of the refractory of the pot and adds interfaces between several types of refractory. Each of these interfaces could be the origin of a leak that can result in electrical shorting and malfunction of the coil. In that case, the pot has to be emptied to change the inductor, and the interface between the refractory of the pot and the coil has to be redone. The pot is taken out of service for an extended period of time while the costly refurbishing process is accomplished. Channel inductors are also used in zinc or copper (cathode or anode) melters (or smelters) for heating and stirring a metal composition where zinc or copper is extracted from ore or scrap by an electrolysis (or electrolytic) process, and are subject to limitations in this process similar to those described above for a coating process.

In Japanese patent application publication JP59145772-A (Aug. 21, 1984) a method of removing flux residue from the region in a coating pot containing a molten metal composition where a continuously moving workpiece is dipped into the coating pot is disclosed. The flux is applied to the workpiece prior to dipping in the molten metal and reacts with the molten metal in the pot. However a flux residue accumulates in the region and interferes with the workpiece coating process. An electromagnetic induction apparatus (7) is installed in the pot near the long length of the workpiece (1) to achieve a 1 meter per minute minimum flow velocity of the molten metal to keep the accumulated dross residue out of the region where the workpiece dips into the molten metal so that the flux residue sticking to the workpiece is thoroughly removed, and the cleaned surface of the workpiece reacts with the bath so that a hot dipped workpiece is obtained.

It is one object of the present invention to provide an electric induction heating apparatus and method for heating a hot molten electrically conductive material in a container wherein the heating apparatus can easily be installed and removed from the container so that when the electric induction heating apparatus is submerged in the material in the container the material can be inductively heated.

It is another object of the present invention to provide a combination electric induction heating and stirring apparatus, and method, for heating and stirring a hot molten electrically conductive material in a container wherein the heating apparatus can easily be installed and removed from the container so that when the electric induction heating apparatus is submerged in the material in the container the material can be electromagnetically stirred.

It is another object of the present invention to provide an electric induction heating apparatus, and method, for heating electrically conductive material in a container wherein the heating apparatus can be easily installed and removed from the container so that when the electric induction heating apparatus is submerged in the material in the container when the material is above liquidus temperature the apparatus can be left in the material when the material drops below liquidus or solidus temperature and the apparatus can be used to reheat the material to above solidus or liquidus temperature.

BRIEF SUMMARY OF THE INVENTION

In one aspect, the present invention is apparatus for, and method of, electric induction heating and/or stirring of an electrically conductive material, such as a molten metal, in a containment vessel. The apparatus may be removably inserted in the containment vessel. An induction coil embedded in refractory or coating can be used to electromagnetically heat and stir molten metal adjacent to opposing external side faces of the apparatus, or within channels formed within the side refractory, or outside surfaces thereof. The term "refractory" as used herein also comprises any type of coating that is resistant to the particular material contained in the vessel.

Alternatively an induction coil embedded in refractory with a gap between opposing faces of two sections of the induction coil can be used to electromagnetically heat and stir molten metal within the apparatus. A molten metal flow path is established in the gap, with the flow path in communication with the exterior of the refractory so that alternating current supplied to the induction coil generates a transverse magnetic (flux) field that inductively heats and moves the molten metal through the flow path formed in the gap.

In another aspect the present invention is a method of channeless electric induction heating or stirring of an electrically conductive composition in a containment vessel used for workpiece coating, or for an electrolysis process for recovery of a metal from ore or scrap. At least one electric induction apparatus that is physically separate from the containment vessel is submerged in the containment vessel. In some examples of the invention a transverse flux field is generated by supplying an alternating current to the submerged electric induction apparatus, and the transverse flux interacts with the electrically conductive composition to electromagnetically heat or stir the composition. Single or multiphase alternating current can be supplied to the submerged electric induction apparatus to create an electromagnetically induced flow of the composition. While submerged in the electrically conductive composition the electric induction apparatus can be moved in one or more directions to control the electromagnetic flow path of the composition. In some examples of the invention a fluid cooling medium can be supplied to the at least one submerged electric induction apparatus to withdraw heat from the electrically conductive composition by conduction to the fluid cooling medium.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings:

FIG. 3(b) and FIG. 3(c) are isometric views of one example of an induction coil used in the apparatus shown in FIG. 3(a).

FIG. 3(f) is a cross sectional view of the induction coil in FIG. 3(b) through line I-I illustrating optional induction coil cooling interior through passages.

FIG. 3(g) illustrates optional cooling coils embedded in the refractory of the submersible induction heating and/or stirring apparatus shown in FIG. 3(a).

FIG. 3(h) illustrates an optional gas flow passage and electrical resistance heating element within the refractory of the submersible induction heating and/or stirring apparatus shown in FIG. 3(a).

FIG. 5(a) is an isometric view of another example of a submersible electric induction heating and/or stirring apparatus of the present invention, and FIG. 5(b) is a partial cross sectional detail through line D-D in FIG. 5(a) of the apparatus shown in FIG. 5(a).

DETAILED DESCRIPTION OF THE INVENTION

Figure 1A:
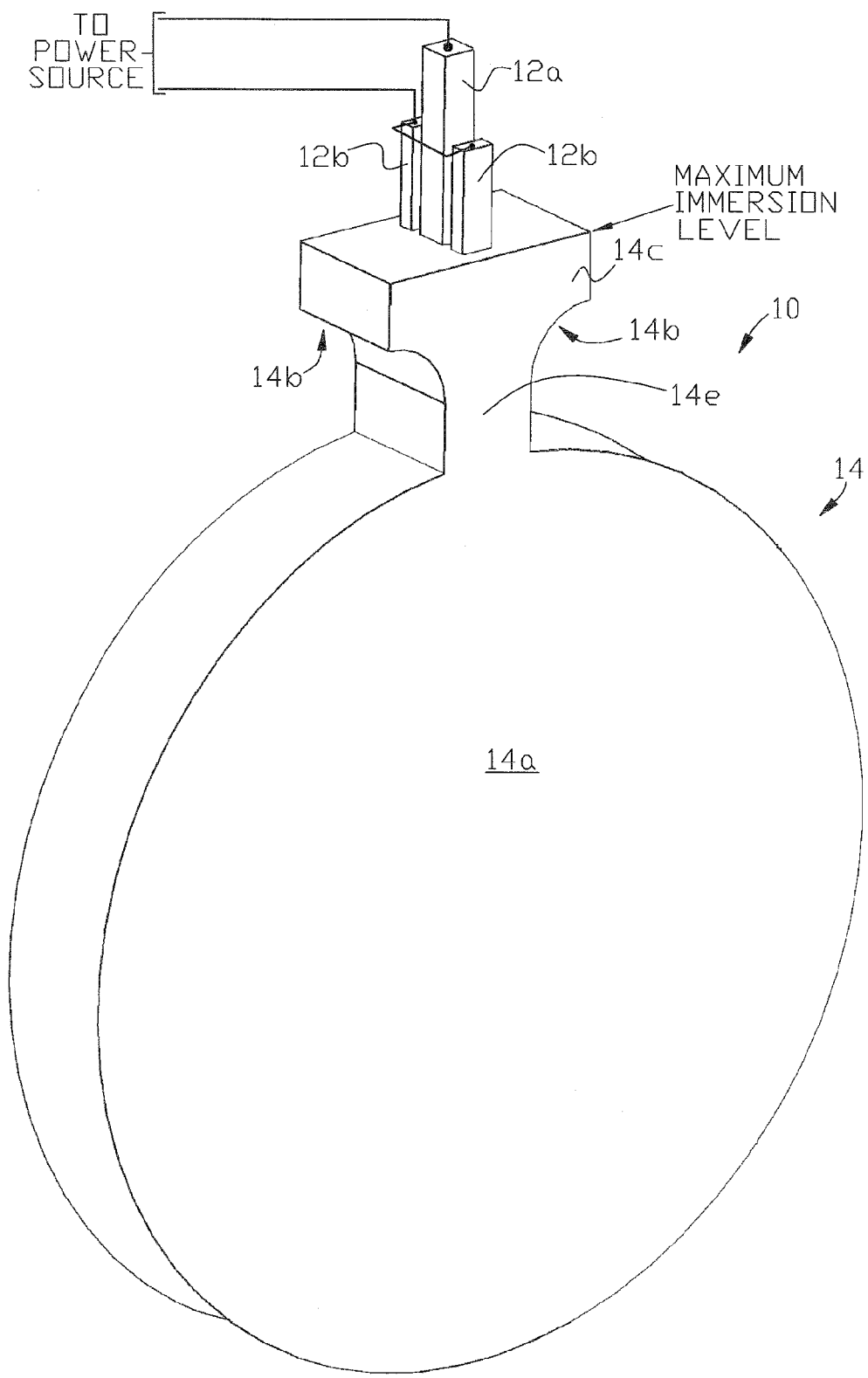
FIG. 1(a) is an isometric view of one example of a submersible induction heating and/or stirring apparatus of the present invention.

FIG. 1(a), FIG. 1(b), FIG. 1(c) and FIG. 1(d) illustrate one example of a submersible electric induction heating and stirring apparatus 10 of the present invention. In use, apparatus 10 is removably inserted in a container, such as a holding vessel, coating pot, or anode or cathode melter, holding molten metal or another electrically conductive material or composition. Induction coil 12 (FIG. 1(*b*)) is embedded within refractory 14 (FIG. 1(*a*)). Although the refractory is shown in the shape of a solid exterior disc in FIG. 1(*a*), any suitable configuration of refractory (that is, any abrasive and heat resistant media) may be used as long as it isolates the embedded coil from the surrounding molten metal. For example the refractory may be shaped in a rectangular or diamond. A suitable refractory or coating material can be selected based upon the type of molten metal in the vessel. For example, if the molten metal is silicon, at least the outer surface of the refractory may be of a nitrate composition to avoid contamination of the molten silicon from the refractory. Further the refractory material may have a protective outer layer such as a silica composition. Other typical but non-limiting selections for the refractory composition include chromium nitride, zirconium carbonitride, boron nitride, titanium nitride or carbide, alumina and other ceramic based refractory compositions, as may be preferred for a particular application. Two or more refractory compositions may be used in a layered arrangement to form a layered composite refractory in a particular application. Application of refractory to the induction coil may be accomplished by any suitable method, for example, by an air or thermal set process; low temperature sputtering process; plasma deposition or flame spray process; or a cathodic deposition process.

One or more lifting elements may be integrally incorporated into the refractory as shown in FIG. 1(*a*) where recesses 14*b* under refractory head 14*c* may be used to engage lifting (transport) apparatus for lowering or raising apparatus 10 into, and out of, the molten metal containment vessel. Refractory neck region 14*e* may be of an extended length to accommodate submersion of apparatus 10 to a desired depth of the material in the containment vessel so that the refractory coating extends to the submersion level of the apparatus.

Induction coil 12 may be formed from a continuous electrical conductor, such as a copper bar having a rectangular cross section. Other suitable shapes of solid or hollow electrical conductors, such as aluminum or electrically conductive steel, may be used in a particular application. If the copper coil is cooled by forced circulation of a cooling medium, such as a suitable fluid cooling medium (for example, water) or a suitable gas cooling medium (for example, air or nitrogen), the copper bar may have an interior through passage (to form a hollow electrical conductor) through which the cooling medium may be circulated (as shown for example in FIG. 3(*f*) as interior through passages 70*a* for spiral coil sections 22' and 22" of induction coil 22). Alternatively separate cooling coils may be embedded in refractory 14 (or refractory 24 as shown in FIG. 3(*g*) as cooling coil 70*b* (in dashed lines)). Induction coil 12 in FIG. 1(*b*) is a planarly aligned spiral coil with inner electrical termination 12*a* and outer electrical terminations 12*b*, with suitable dielectric material between the inner and outer terminations as may be required. Other configurations of one or more induction coils may be used within suitable refractory in other examples of the invention. For example the physical characteristics and electrical performance characteristics of the one or more induction coils can be selected for a particular application based upon electromagnetic stirring requirements; induced power requirements; and any dimensional constraints, for example related to the volume of the containment vessel or layout of any components in the containment vessel. In the applications of the present invention where the induction coil is immersed in a molten metal composition that serves as a quasi-infinite heat sink as further described below, the induction coil may be formed from any material that is an electric conductor, whether metallic (for example, copper, aluminum or steel compositions) or non-metallic (for example, a graphite composition). Further in some applications the induction coil may be formed from superconducting materials, for example superconducting compositions with a high-critical temperature.

FIG. 1(*c*) and FIG. 1(*d*) illustrate typical lines of magnetic flux 92 that are produced around coil 12 when single phase alternating current is supplied to terminals 12*a* and 12*b*. When instantaneous current flow through the coil is in the direction of the arrows 72 (shown on the coil surface in FIG. 1(*c*)), a typical representative current flow pattern of the molten material that is electromagnetically induced in the molten metal adjacent to side face 14*a* (FIG. 1(*d*)) of the refractory is illustrated by representative arrowed circle 94 in FIG. 1(*c*) and FIG. 1(*d*); a similar representative flow pattern is also created on the opposing side face of the refractory not visible in the figures.

Another example of a submersible electric induction heating and stirring apparatus 11 of the present invention is shown in FIG. 2(*a*) and FIG. 2(*b*). In this example apparatus 11 comprises solenoidal induction coil 42 that is coated with a heat resistant, electrical insulating material 44 by a suitable coating process. By way of example, coating material 44 includes crystalline or non-crystalline ceramics formed around coil 42 up to at least the maximum immersion level of the coil into the bath of electrically conductive material. Coil terminals 42*a* and 42*b* are connected to a suitable alternating current power source. As shown in FIG. 2(*c*) the current through coil 42 establishes an alternating magnetic flux field (illustrated by representative (dashed) flux lines 93) that results in an alternating bidirectional circular electromagnetically induced molten metal flow pattern within the solenoidal coil as shown by the double headed arrow in FIG. 2(*c*). If the coil is separated into two or more multiple coil sections along its length, L, with each section connected to an alternating current power source with suitable phase shifted output currents, then a unidirectional electromagnetically induced molten metal current flow can be established along the length, L, within the interior of coil 42 formed from the multiple coil sections, for example, as shown in FIG. 2(*d*) where three coil sections (11', 11" and 11''') are utilized and the output currents of power supplies PS1, PS2, and PS3 are 120 degrees out of phase with each other, as diagrammatically illustrated in FIG. 2(*e*).

Since the molten metal in the containment vessel acts as a quasi-infinite heat sink for Joule ($I^2R$) heating in induction coil 42, coating material 44 need only be sufficiently thick to prevent shorting of the turns of induction coil 42. That is, the heat capacity and transfer rate of the moving molten metal, which is typically at a lower temperature than the temperature of the coil with current flow from Joule heating, can be sufficient to remove heat from coil 42 by heat conduction through coating material 44 and contact with the moving molten metal composition. Therefore induction coil 42 may be of solid cross section, or hollow cross section (to take advantage of skin effect conduction), without forced flow of a cooling medium through the hollow interior of the coil in some applications of the invention.

The above examples of the induction heating and stirring apparatus of the present invention heat and/or stir an electrically conductive material in a containment vessel in which the apparatus is submerged and utilize longitudinal (axial) magnetic flux to achieve induced heating of the material and/or electromagnetically induced stirring of the material. The configuration of the one or more induction coil(s) in the above examples may be of any shape as required to achieve a heating pattern and/or stirring pattern of the material adjacent to the apparatus.

Figure 3A:
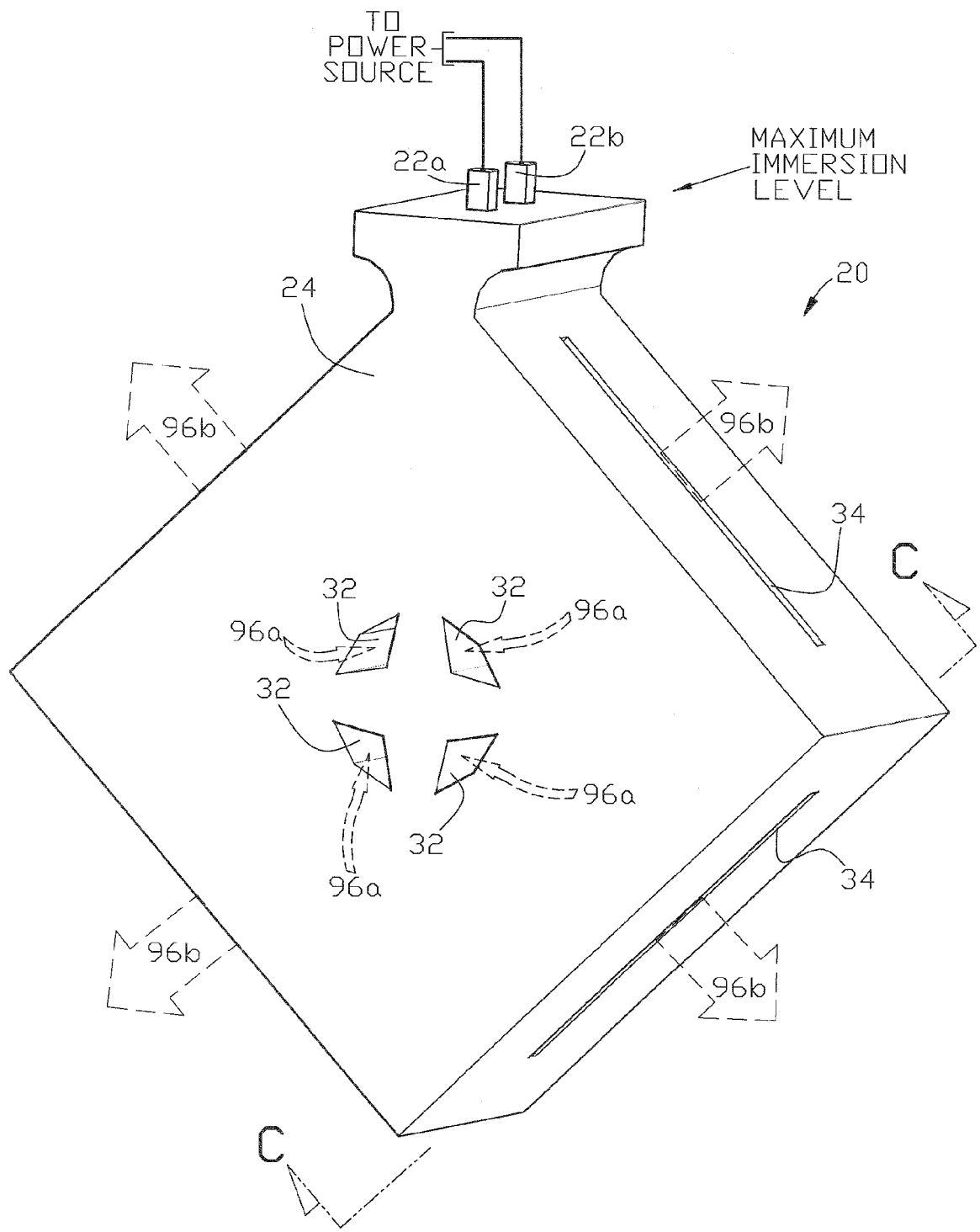
FIG. 3(a) is an isometric view of another example of a submersible induction heating and/or stirring apparatus of the present invention.

In other examples of the invention, heating and stirring of the electrically conductive material may occur within the submerged apparatus and utilize transverse magnetic flux to achieve induced heating of the material and electromagnetic stirring of the material. For example FIG. 3(a), FIG. 3(b) and FIG. 3(c) illustrate one example of an electric induction heating and stirring apparatus 20 of the present invention where molten metal is drawn into one or more centrally located inlet openings 32 of the apparatus (as illustrated by flow arrows 96a in FIG. 3(a)), and expelled from one or more side outlet openings 34 of the apparatus (as illustrated by flow arrows 96b in FIG. 3(a)).

Figure 3C:
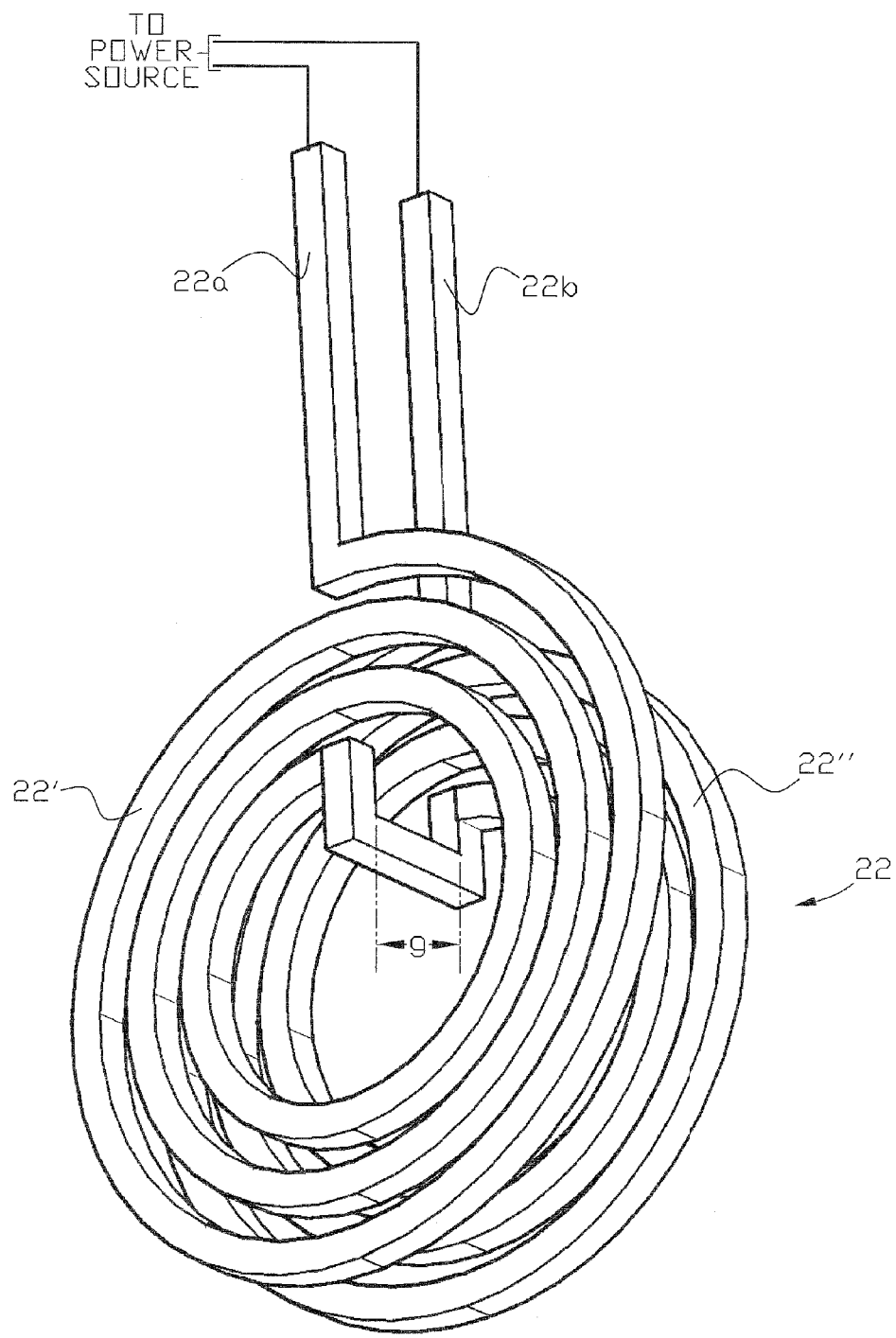

Apparatus 20 comprises induction coil 22 (FIG. 3(b) and FIG. 3(c)) embedded within refractory 24. Configuration and composition of refractory 24 may be as described for other examples of the invention. As shown in FIG. 3(b) and FIG. 3(c) induction coil 22 is configured as two spiral coil sections 22' and 22" connected in series and planarly spaced apart from each other by gap "g". Electrical terminations 22a and 22b are connected to a suitable source of alternating current not shown in the figures. As in other examples of the invention, provisions may be made for cooling of the induction coil. Other configurations of one or more induction coils may be used within suitable refractory or coating, as described in other examples of the invention, with the one or more induction coils arranged to form a suitable gap between them for the interior flow passage.

A suitable interior material flow channel, or passage, is established within apparatus 20 so that a continuous interior material flow path is established from inlet openings 32; through the gap between the two coil sections; and to outlet openings 34. The interior flow passage may be formed, for example, by use of one or more fabrication molds retained in positioned relative to the induction coil while refractory is formed around the induction coil and the one or more fabrication molds. The one or more fabrication molds may be suitably removed after formation of the interior material flow passage by a known method after the refractory walls adjacent to the outside of the mold(s) has been treated to withstand erosion from material flowing through the interior material passage. Alternatively the induction channel forming process described in United States patent publication no. 2008/0253425 A1, which is incorporated herein by reference in its entirety, may be used to form the interior flow passage. The gap between the coil sections and/or interior material flow channel can be formed and oriented in any desired configuration. For the example the interior material flow channel may comprise a series of interconnected flow channels formed between the coil sections as opposed to a singular flow channel between the inlet and outlet openings.

Figure 3D:
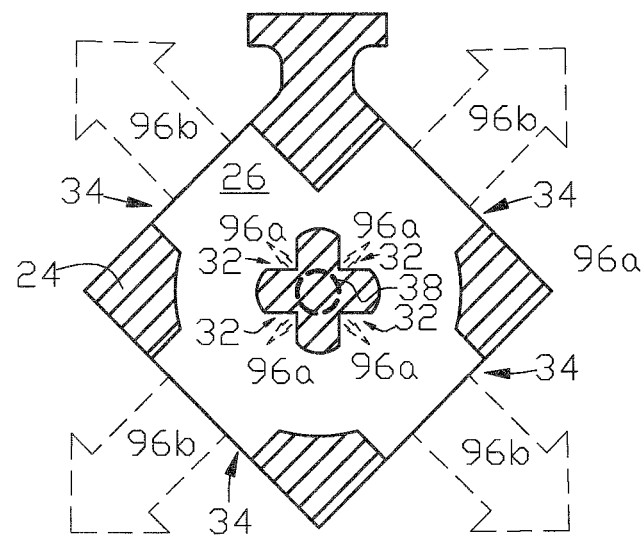
FIG. 3(d) is a cross sectional view of one example of the apparatus in FIG. 3(a) through line C-C in FIG. 3(a) showing an internal flow passage.
Figure 3E:
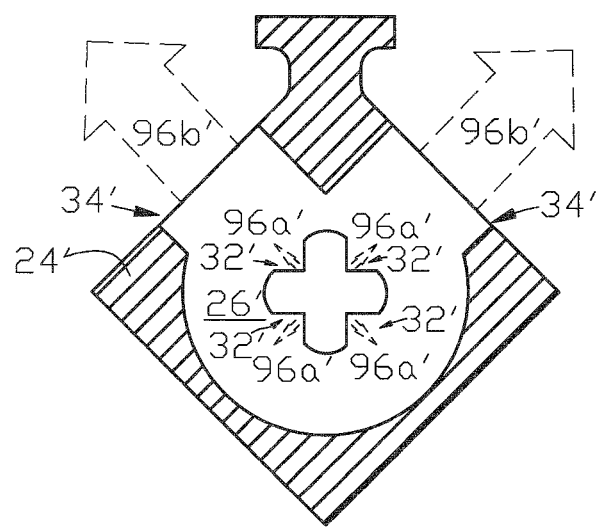
FIG. 3(e) is an alternative cross sectional view of another example of the apparatus in FIG. 3(a) through line C-C in FIG. 3(a) showing an alternative internal flow passage.

FIG. 3(d) illustrates one example of a single annular interior flow path 26 established in the gap between coil sections 22' and 22". Magnetic flux established between the two sections of induction coil 22 when alternating current is supplied to the coil induces eddy current in molten metal present in the gap flow passage between the two coil sections. The induced current heats the metal and expels it from outlet openings 34 and into the containment vessel while molten metal is drawn into inlet openings 32 from the containment vessel. Other arrangements of inlets and outlets from the formed refractory around the coil sections may be utilized in other examples of the invention. For example in FIG. 3(e) only two upwards facing outlet openings 34' are provided so that electromagnetically induced current flow is from side refractory inlet openings 32; through the interior flow channel; and out of the two upwards facing outlet openings.

A magnetic core can optionally be provided in the central region formed around inlet openings 32 to increase the efficiency of the apparatus for example as shown (dashed circle 38) in FIG. 3(d).

Figure 4:
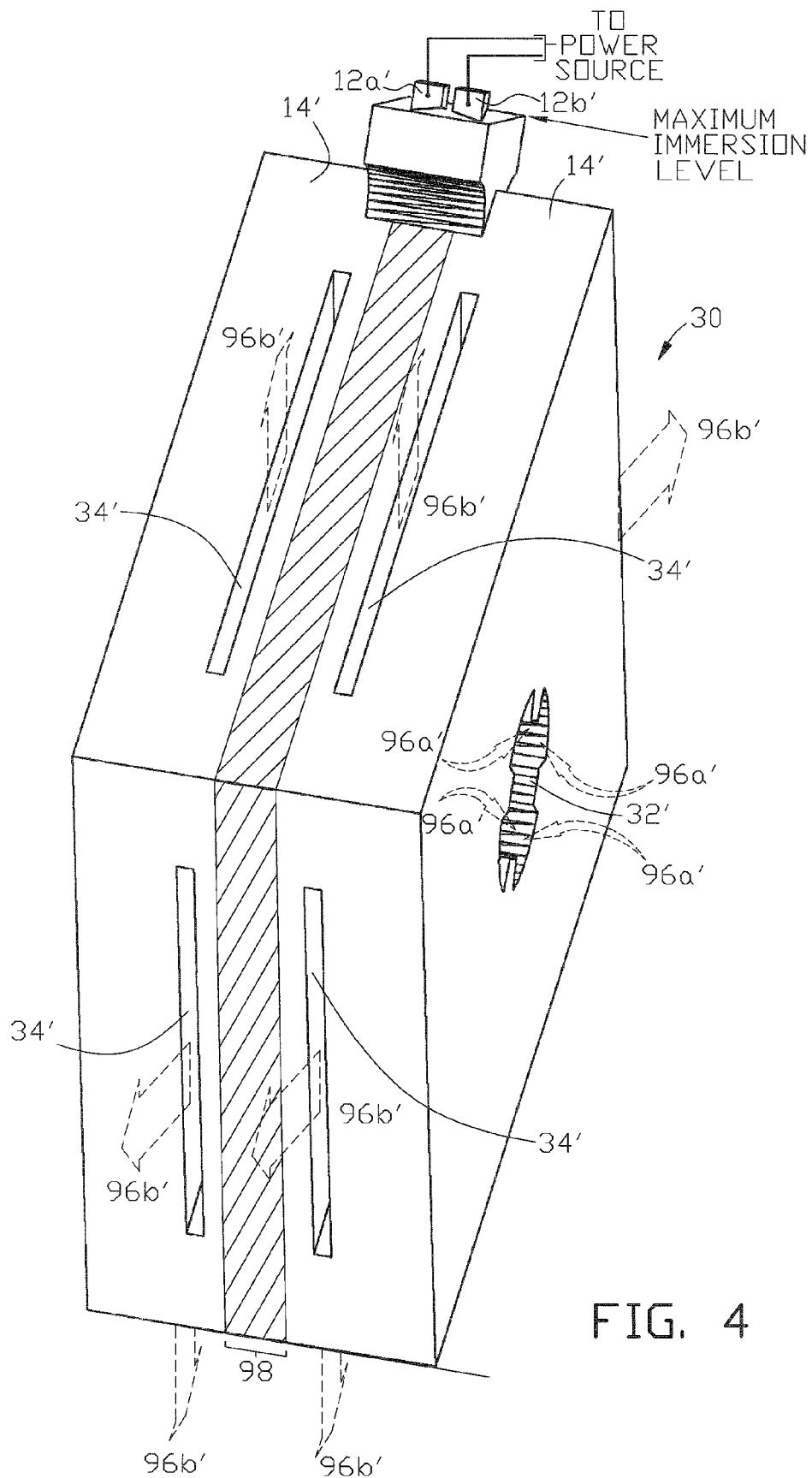
FIG. 4 is an isometric view of another example of a submersible induction heating and/or stirring apparatus of the present invention.

FIG. 4 illustrates another example of an electric induction heating and stirring apparatus 30 of the present invention. In this example, apparatus 10 (FIG. 1(a)), which is shown within the central crosshatched region 98 in FIG. 4, is supplemented by an additional side layer of refractory 14' on at least one side face of apparatus 10 in the crosshatched region, so that an internal flow passage can be established with refractory 14' with suitable inlet and outlet openings. In this example a suitable induction coil is embedded within the central crosshatched region with exposed terminals 12a' and 12b', and is connected to a suitable source of alternating current. In FIG. 4 a continuous interior molten metal flow path is established in refractory 14' from one or more inlet openings 32' (as illustrated by flow path arrows 96a' in FIG. 4); through the internal flow passage in side refractory 14; and to outlet openings 34' (as illustrated by flow path arrows 96b' in FIG. 4). As with apparatus 20 (FIG. 3(a)), the flow passage may be formed, for example, by use of one or more molds around which the refractory is formed. Apparatus 30 in FIG. 4 differs from apparatus 10 (FIG. 1(a)) in that the flow path of the molten metal on at least one side of the apparatus is defined by a controlled internal flow passage in refractory 14' rather than a free flow path of molten metal adjacent to a side face of apparatus 10, which provides improved efficiency stirring and heating over that achievable with apparatus 10. That is, apparatus 30 establishes an external (from coil) in-refractory flow passage on at least one side face of the apparatus. Other arrangements of inlets to, and outlets from, refractory 14' may be utilized in other examples of the invention.

Figure 1B:
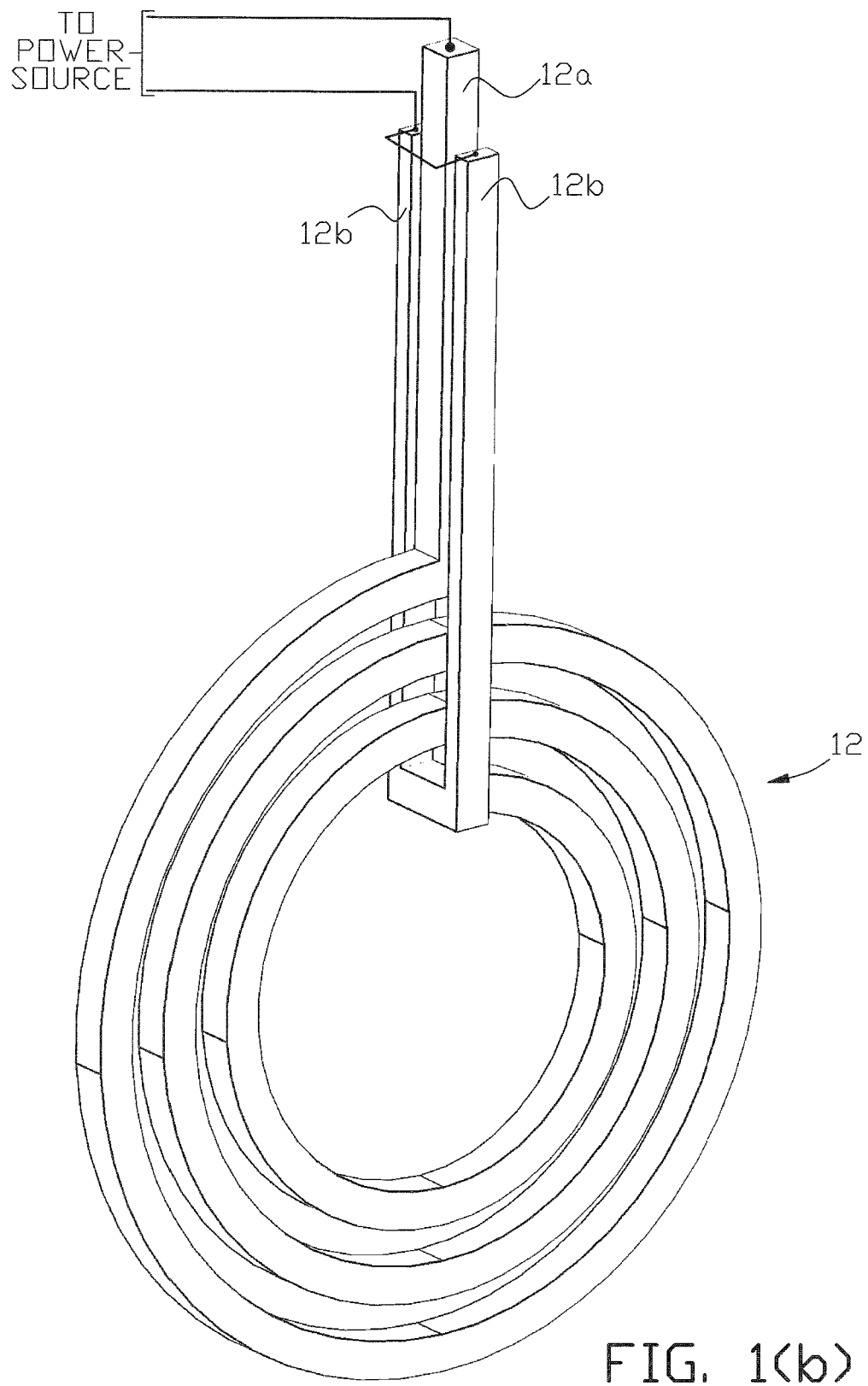
FIG. 1(b) is an isometric view of one example of an induction coil used in the apparatus shown in FIG. 1(a).
Figure 1C:
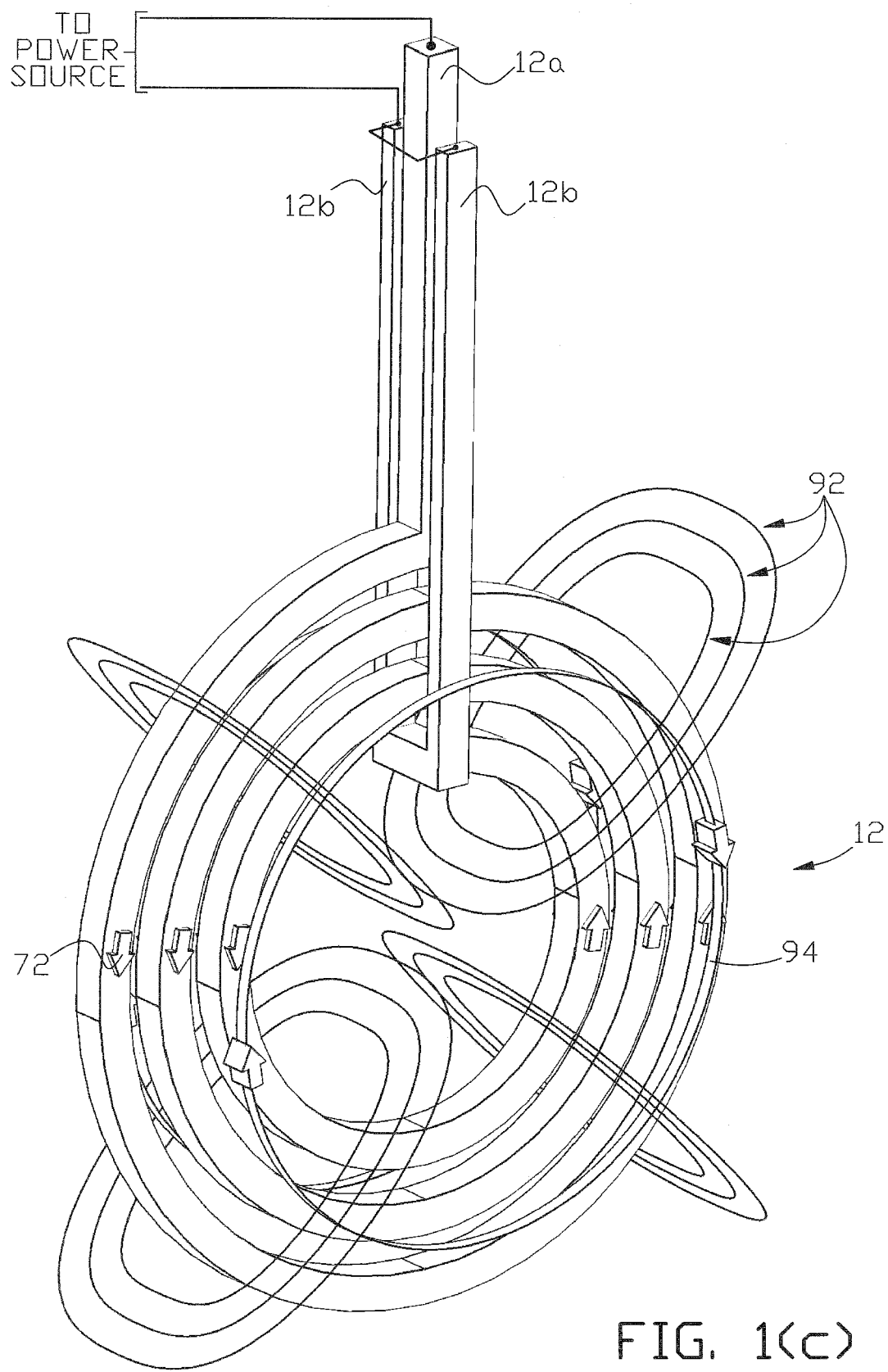
FIG. 1(c) illustrates typical instantaneous magnetic flux lines and electromagnetic flow patterns when the induction coil shown in FIG. 1(b) is supplied with alternating current.
Figure 1D:
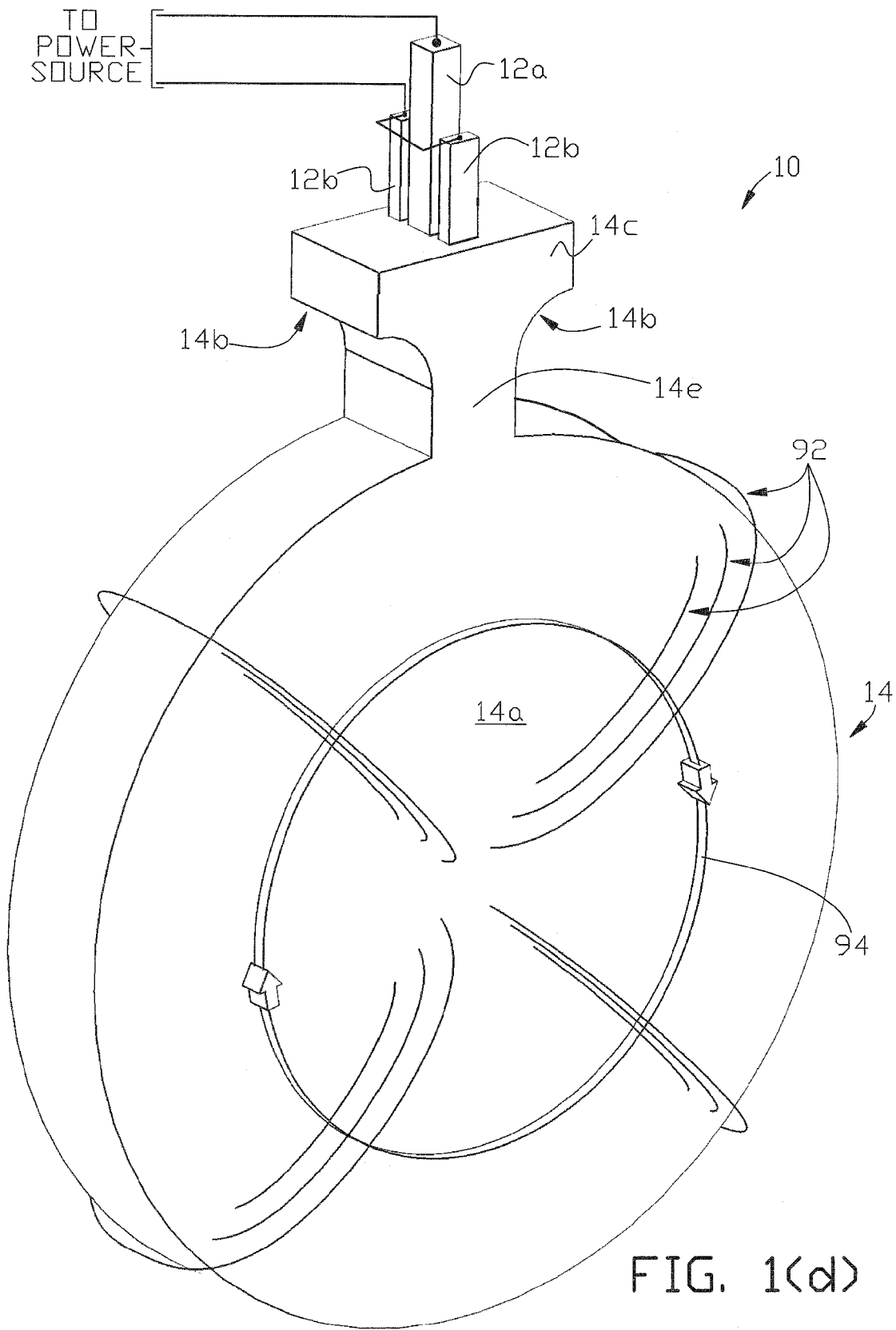
FIG. 1(d) illustrates these flux lines and flow paths when the apparatus shown in FIG. 1(a) is submerged in an electrically conductive material in a containment vessel.
Figure 2A:
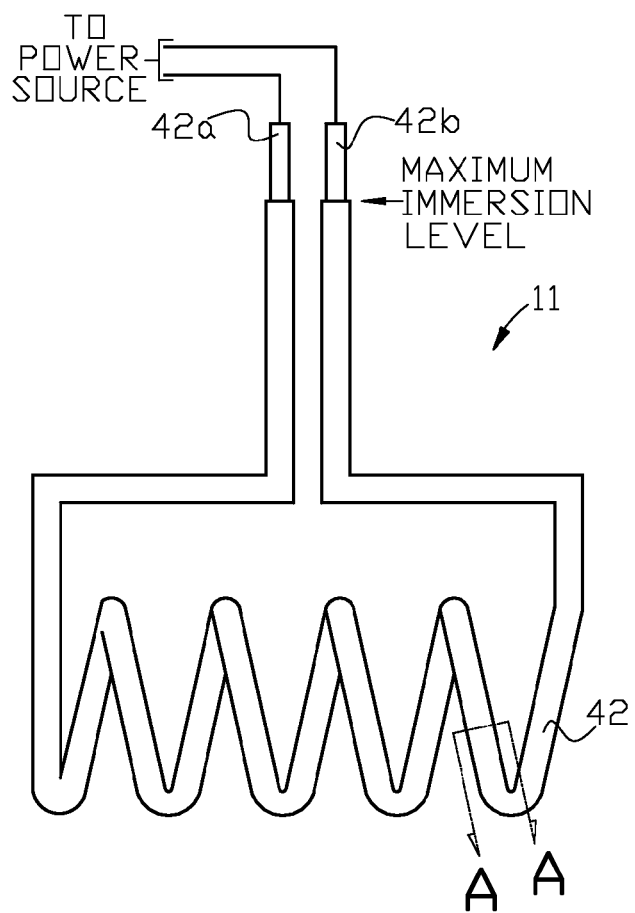
FIG. 2(a) is a side elevation view of another example of a submersible induction heating and/or stirring apparatus of the present invention.
Figure 2B:
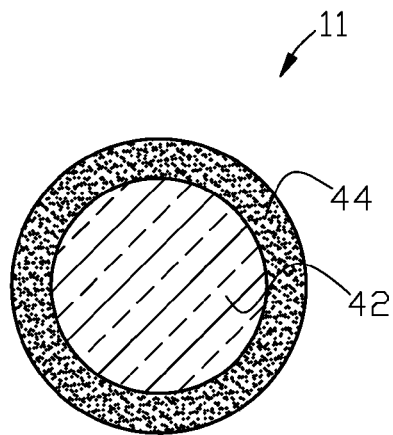
FIG. 2(b) is a cross sectional view of a coated solenoidal induction coil used in the apparatus shown in FIG. 2(a) through line A-A.
Figure 2C:
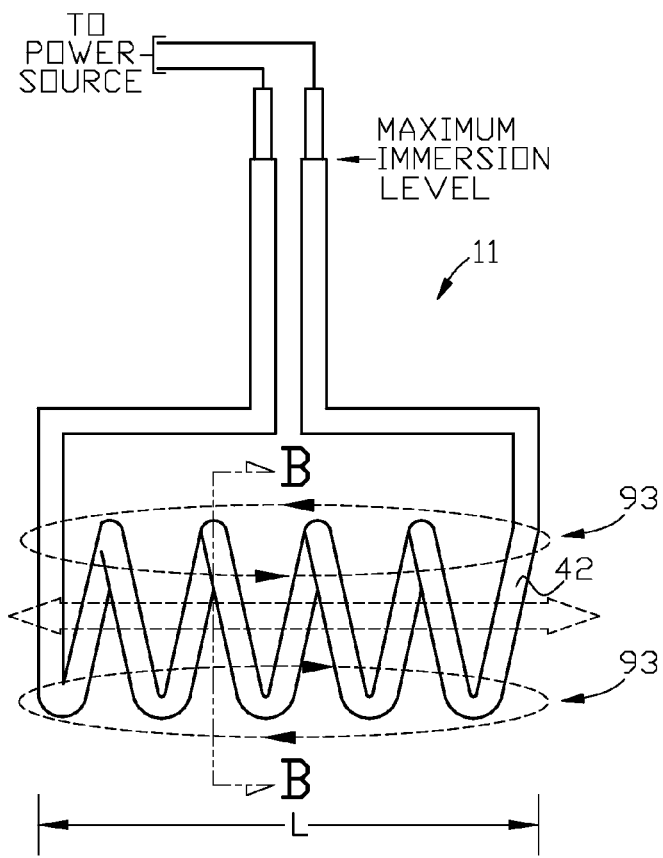
FIG. 2(c) illustrates typical bi-directional magnetic flux lines when the apparatus shown in FIG. 2(a) is supplied with alternating current.
Figure 2D:
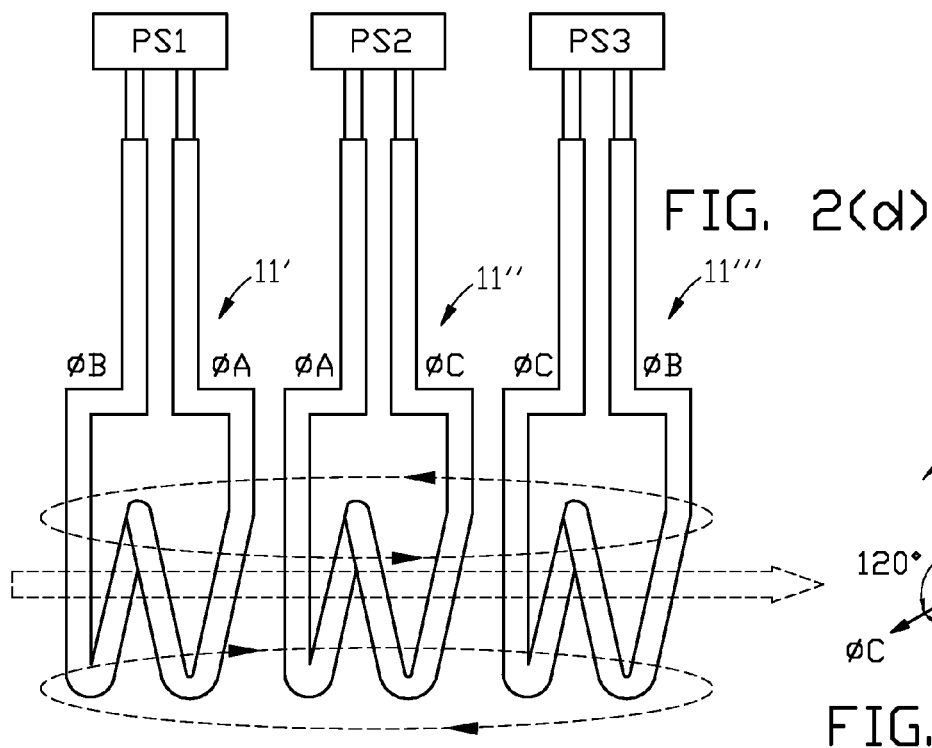
FIG. 2(d) is a side elevation view of another example of a submersible induction heating and/or stirring apparatus of the present invention utilizing a multi-section solenoidal induction coil to establish a unidirectional electromagnetically induced flow in an electrically conductively material by phase shifting currents to the multiple sections of the induction coil as diagrammatically illustrated in FIG. 2(e).
Figure 2E:
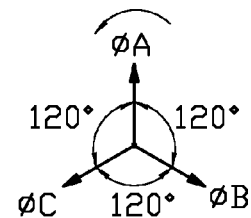

FIG. 5(a) illustrates another example of an electric induction heating and stirring apparatus 40 of the present invention. In this example, apparatus 40 is similar to apparatus 10 (FIG. 1(a)) with the addition of one or more narrow concentric channels 15 formed in at least one side face 14a" of refractory 14". In this example a suitable induction coil 12", which can be similar to induction coil 12 in FIG. 1(b), is embedded within the central region with exposed terminals 12a" and 12b". The depth "d" of channel 15 is preferably sufficient so that molten metal in a channel is at least partially within a standard depth of eddy current penetration established by the magnetic field when alternating current is flowing through induction coil 12" while thermal isolation of induction coil 12" from the hot molten metal in the channel is maintained by refractory 14" as shown in the partial cross sectional detail of FIG. 4(b). This arrangement is favorable for an application where molten metal heating is favored over electromagnetic stirring.

In other examples of the invention the distance between adjacent spirals of the induction coils may be sufficiently large to protect the spiral sections with refractory or coating and maintain an open flow path between the spiral sections for the electrically conductive material to flow between adjacent spiral sections. That is the induced flow path of material can pass through each turn of the spiral.

In other examples of the invention, a submersible electric induction heating and stirring apparatus of the present invention may combine one channeled side face as shown in FIG. 5(a) and one flow passage side face as shown in FIG. 4.

Figure 6A:
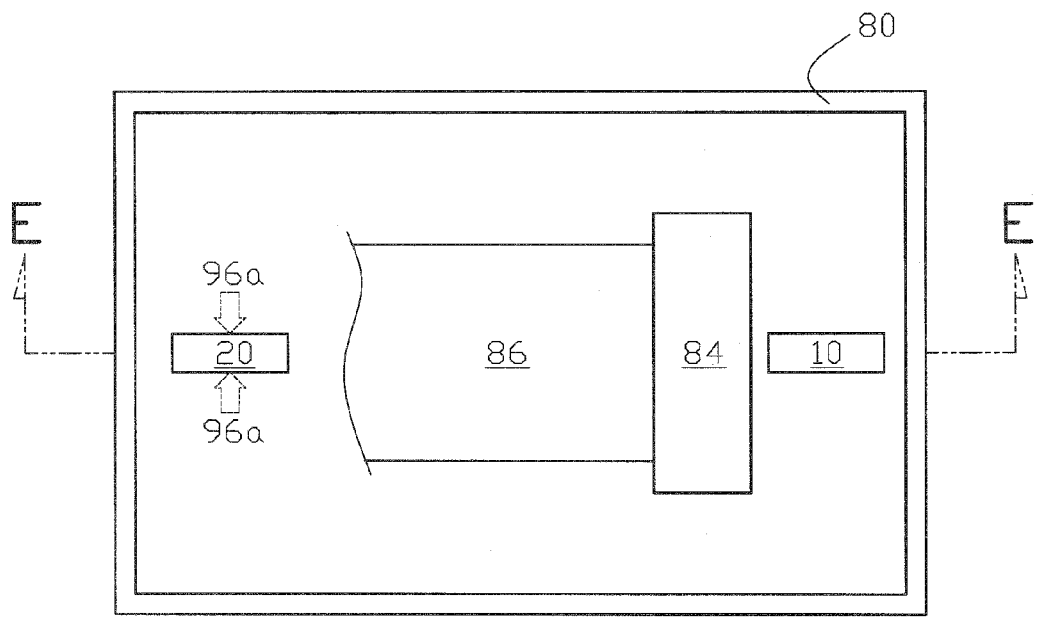
FIG. 6(a) is a top elevational view of one application of a submersible induction heating and/or stirring apparatus of the present invention in a containment vessel for an electrically conductive material.
Figure 6B:
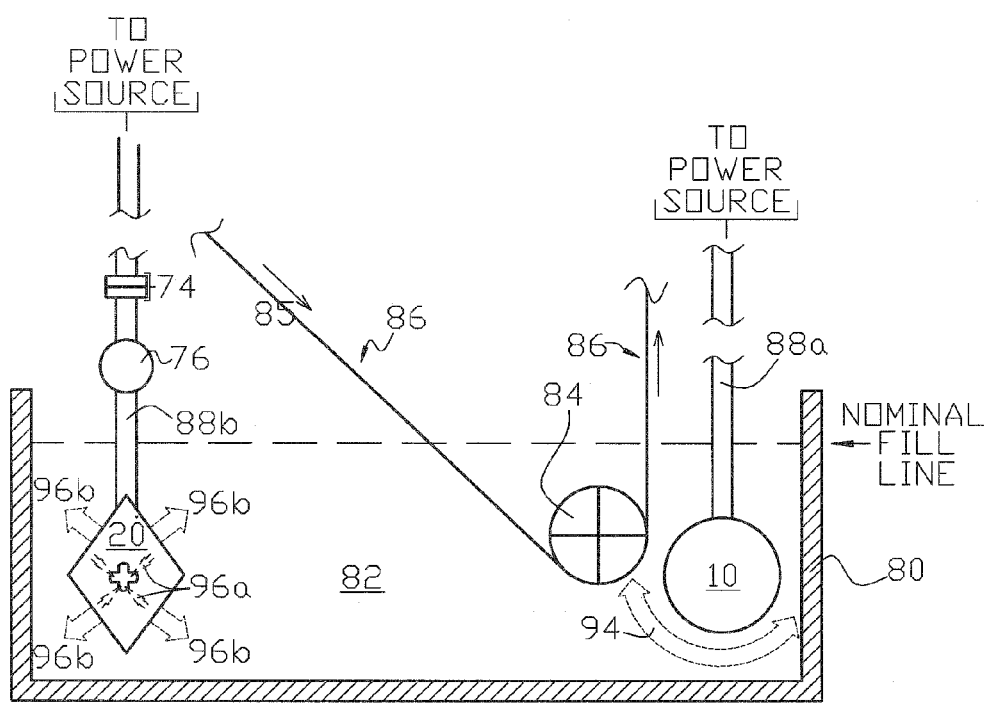
FIG. 6(b) is a cross sectional elevation view of the containment vessel shown in FIG. 6(a) through line E-E.

One particular application of a submersible electric induction heating and/or stirring apparatus of the present invention is in continuous hot dip galvanizing lines, or batch type galvanizing processes utilizing various metal alloys such as zinc, aluminum, or zinc-aluminum alloys at temperatures above liquidus. FIG. 6(a) and FIG. 6(b) are one example of a containment vessel 80 for an electrically conductive material 82 in which the submersible electric induction heating and/or stirring apparatus of the present invention may be used. In this particular application, a liquid coating material, such as a zinc composition, is an electrically conductive material 82 in the vessel or coating pot. One or more rollers 84, and associated components, are suitably submerged in the zinc composition to provide strip material immersion apparatus as known in the art. Continuous strip 86 is the workpiece or article being coated with the zinc composition by continuously pulling the strip under the roller in the direction indicated by the arrows adjacent to the strip. In this example electric induction heating and stirring apparatus 10 is removably submerged by transport apparatus 88a into the zinc composition in the region where strip 86 uptakes in exit from the coating pot. Optionally a seating structure may protrude from the wall of the coating pot so that apparatus 10 can be removably supported on the seating structure while in the coating pot without continuous support from suitable transport apparatus 88a so that the transport apparatus can be disengaged from apparatus 10 while it is situated in the pot. Alternatively the refractory can be formed in a shape that allows apparatus 10 to be seated on the interior bottom of the coating pot. Electric induction heating and stirring apparatus 20 can be removably inserted by suitable transport apparatus 88b into the zinc composition near the wall of the coating pot farthest away from roller 84. Alternatively the transport apparatus 88b may disengage the submerged heating and stirring apparatus 20 in the coating pot and allow apparatus 20 to "freeze" (solidify) in the material in the coating pot if the temperature of the electrically conductive material drops to solidus temperature. In event of this temperature drop, one or more of the electric induction heating and stirring apparatus at least partially submerged in the solid or semisolid material may be used to heat the material and raise the temperature of the material above solidus temperature. In the submerged position shown in the figures, apparatus 20 draws molten zinc into its central side regions approximately at mid depth of zinc in the coating pot as illustrated by flow arrows 96a in FIG. 6(a) and expels heated zinc from its interior flow passages into the upper and lower depths of zinc in the coating pot as shown by flow arrows 96b.

Transport apparatus 88a and 88b may be suitable mechanical apparatus suitably attached to electric induction heating and stirring apparatus 10 and apparatus 20, respectively, and arranged to raise and lower the apparatus out of, and into, the zinc in the coating pot, as may be required in a particular application. The transport apparatus may optionally include a lock and release mechanism (as shown for example in FIG. 6(b) as lock and release mechanism 74 for transport apparatus 88b) for automatic release of a heating and stirring apparatus (either in or out of the coating pot) and automatic lock to the heating and stirring apparatus (either in or out of the coating pot). The transport apparatus may optionally include multiple "degrees of freedom" hardware to allow the transport apparatus to move a submerged heating or stirring apparatus of the present invention in up to six degrees of freedom so that the directions of the induced heating patterns or electromagnetically induced stir patterns in the electrically conductive material can be dynamically altered (as shown for example in FIG. 6(b) as submersible inductor assembly translation or rotation subassembly 76). Alternatively the direction of the electromagnetically induced flow may be changed by changing the phasing of a single or multiphase current supplied to the induction coil or coils making up the heating and stirring apparatus.

Figure 7A:
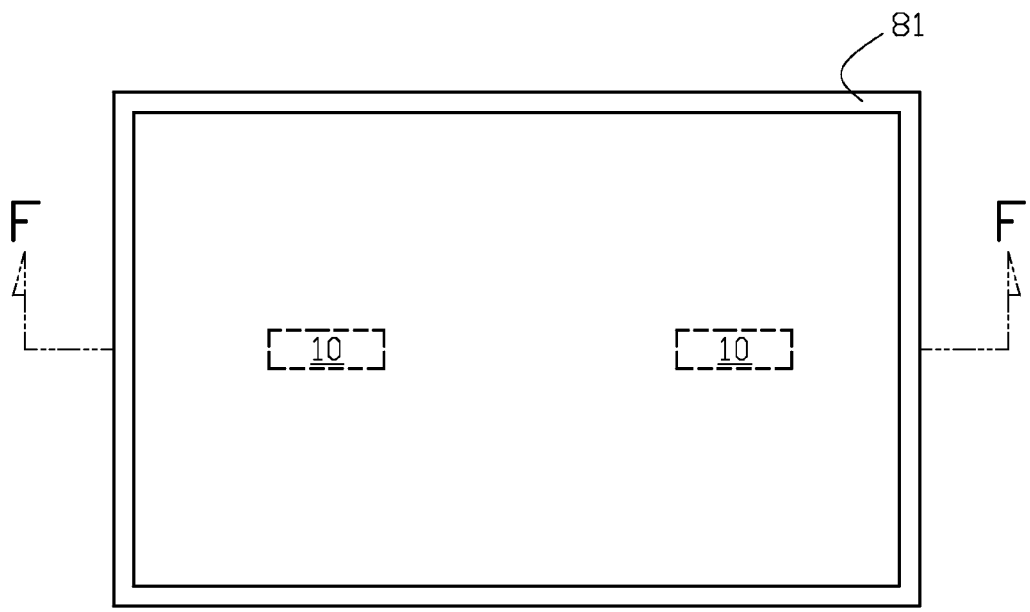
FIG. 7(a) is a top elevational view of another application of a submersible induction heating and/or stirring apparatus of the present invention in a containment vessel for an electrically conductive material.
Figure 7B:
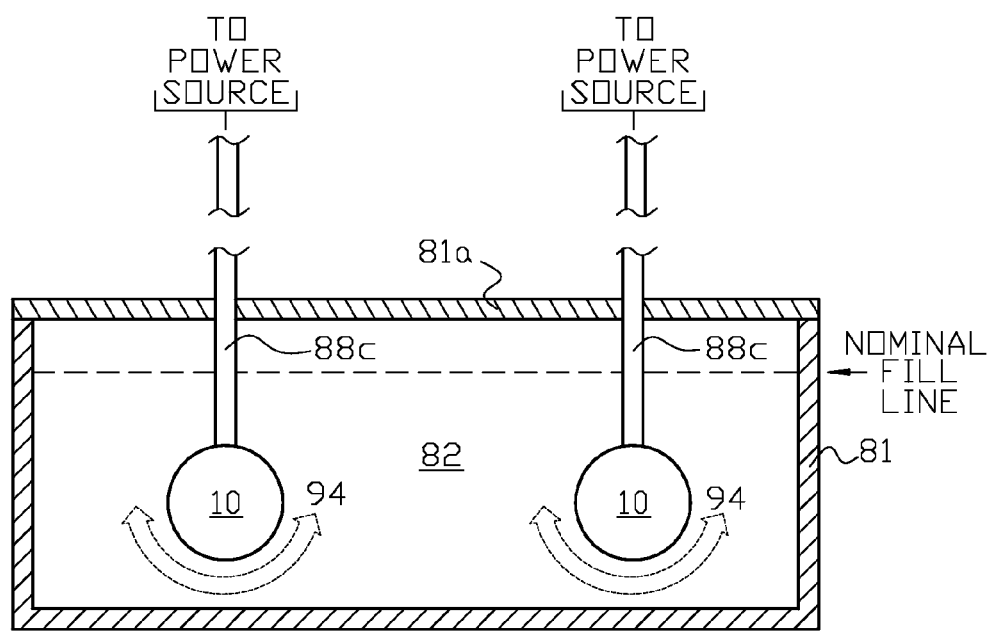
FIG. 7(b) is a cross sectional elevation view of the containment vessel shown in FIG. 7(a) through line F-F.

FIG. 7(a) and FIG. 7(b) is another example of a containment vessel application of the present invention. In this example the containment vessel may be coating pot 81 filled with hot molten zinc 82 that is being held in reserve for replacement of a coating pot in an active coating line that has strip material immersion apparatus submerged in the pot. In this application two electric induction heating and stirring apparatus 10 may be optionally attached to removable lid 81a with the lid positioned over the open top of the coating pot so that the pair of apparatus 10 is submerged in the zinc melt to keep the zinc melt at a desired temperature until the coating pot is ready for installation on an active coating line. In this arrangement the transport apparatus can be connected to the removable lid so that the lid and attached apparatus 10 are raised or lowered together.

Figure 8A:
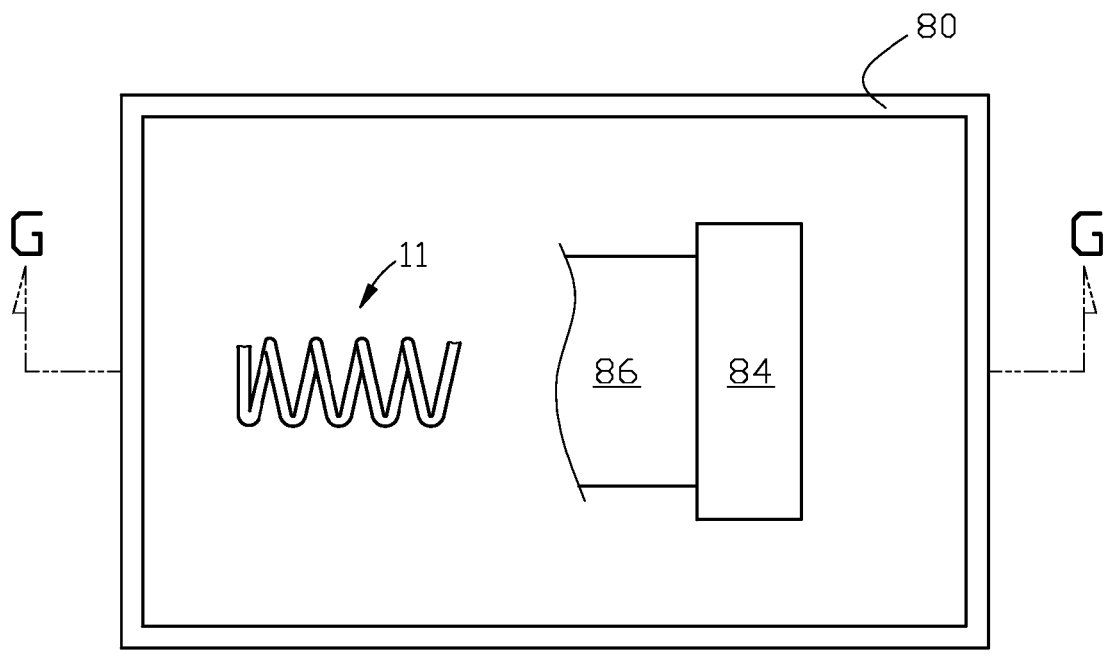
FIG. 8(a) is a top elevational view of another application of a submersible induction heating and/or stirring apparatus of the present invention in a containment vessel for an electrically conductive material.
Figure 8B:
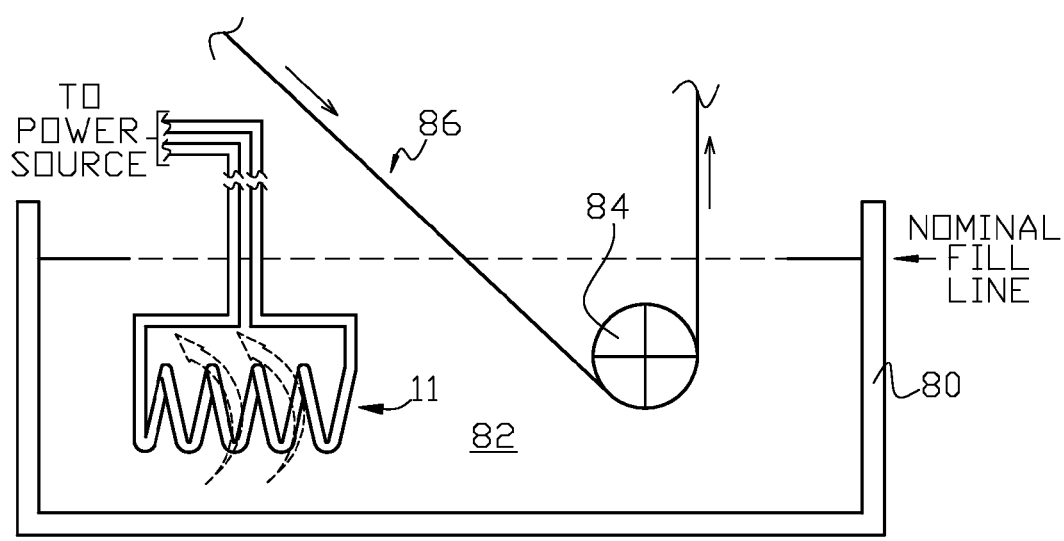
FIG. 8(b) is a cross sectional elevation view of the containment vessel shown in FIG. 8(a) through line G-G.

FIG. 8(a) and FIG. 8(b) are another example of a containment vessel 80 for an electrically conductive material in which a submersible electric induction heating and/or stirring apparatus of the present invention may be used. This application is similar to that in FIG. 6(a) and FIG. 6(b) except that submersible electric induction heating and stirring apparatus 11 is utilized. Apparatus 11 may be attached to a suitable transport apparatus as previously described above for apparatus 10 or 20, and as shown in FIG. 6(a) and FIG. 6(b). Seating structure may be provided in the containment vessel as previously described above for apparatus 10 or 20 so that apparatus 11 can, for example, be disengaged from its transport apparatus while removably positioned in the vessel.

Figure 9A:
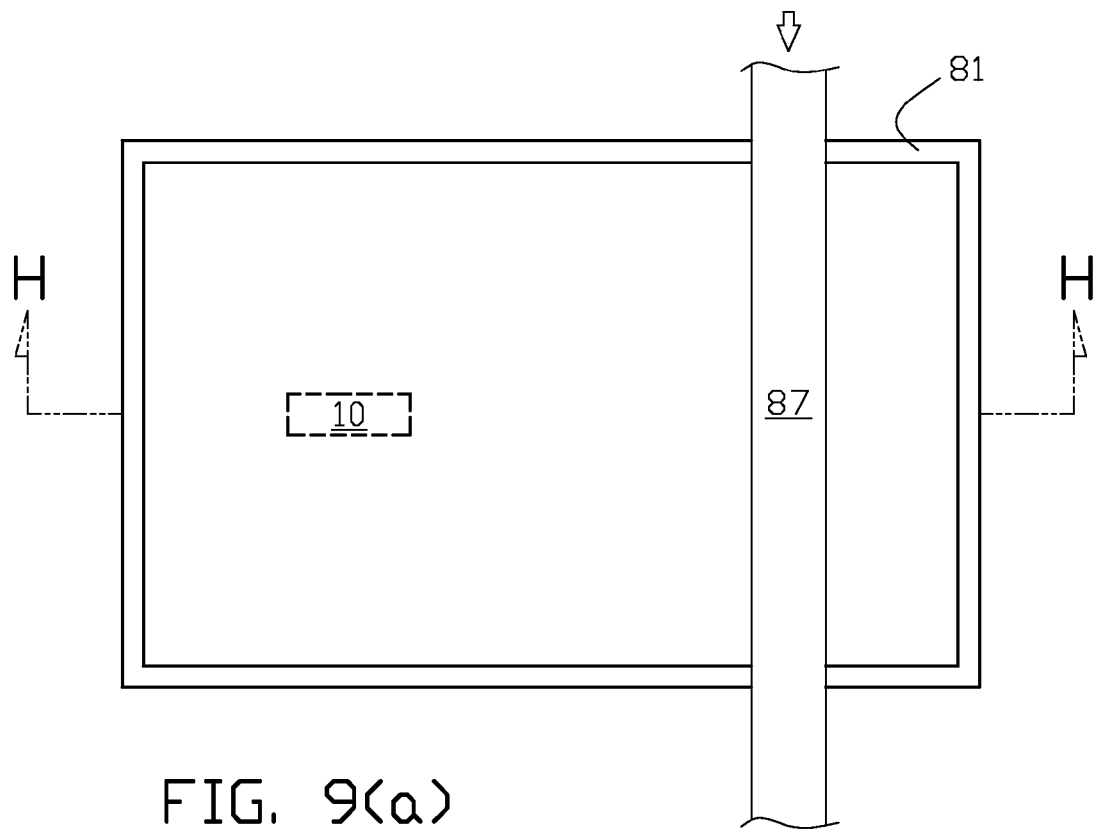
FIG. 9(a) is a top elevational view of another application of a submersible induction heating and/or stirring apparatus of the present invention in a containment vessel for an electrically conductive material.
Figure 9B:
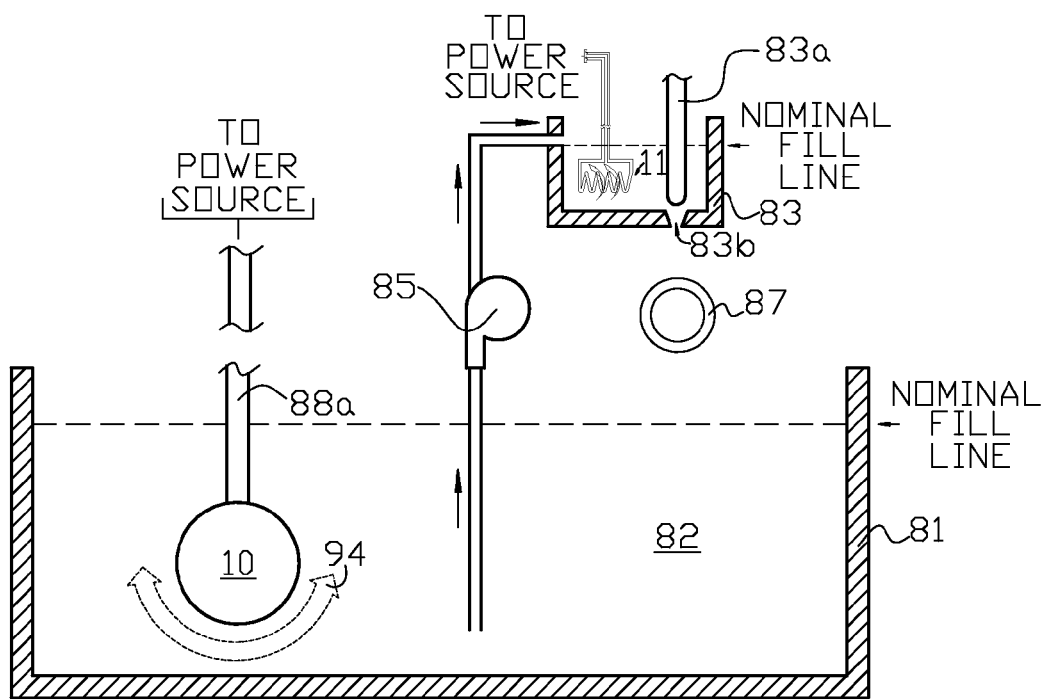
FIG. 9(b) is a cross sectional elevation view of the containment vessel shown in FIG. 9(a) through line H-H.

In a workpiece coating application where the workpiece is not sufficiently flexible for "bending" or dipping into a containment vessel, such as a rigid pipe or conduit, an alternative method of coating must be used. For example in FIG. 9(a) and FIG. 9(b) electrically conductive material, such as zinc 82, is pumped from main containment vessel 81 into overhead pouring vessel 83 via pump 85. In this example the pouring vessel is a controlled bottom pour container with stopper rod 83a controlling the flow of zinc 82 through the nozzle. Pipe 87 is continuously advanced under bottom nozzle 83b while zinc pouring out of the bottom nozzle coats the exterior circumference of the pipe with excess zinc falling back into main containment vessel 81. In addition to linear advancement of the pipe as indicated by the arrow in FIG. 9(a) the pipe may be continuously rotated about its central axis to facilitate an even coating of zinc around its exterior circumference. One or more submersible induction heating and/or stirring apparatus of the present invention may be used in the main containment vessel and/or the overhead pouring vessel. For example as shown in FIG. 9(a) and FIG. 9(b) apparatus 10 is used in main containment vessel 81 and apparatus 11 is used in overhead pouring vessel 83.

Figure 10:
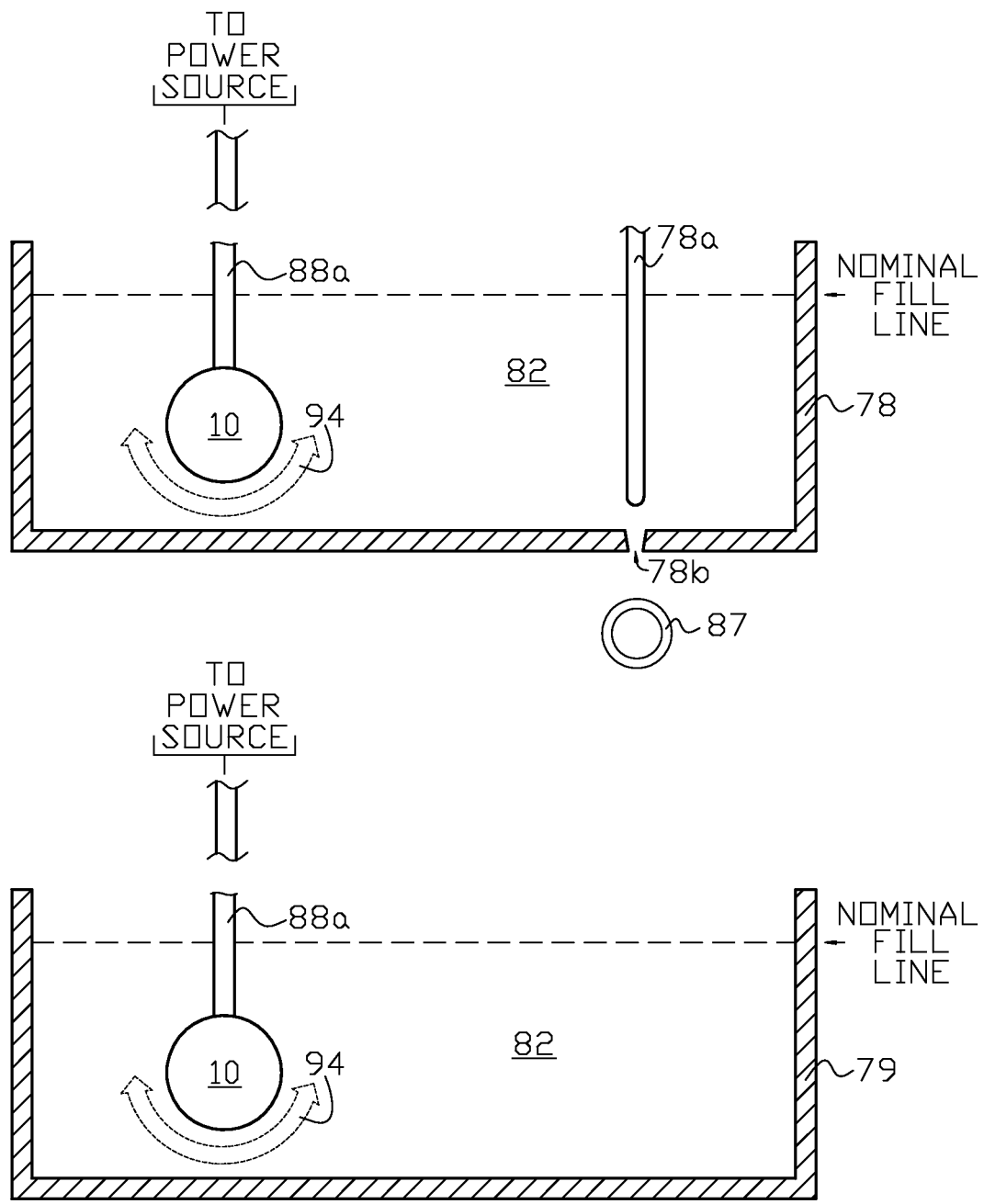
FIG. 10 is a cross sectional elevation view of another application of a submersible induction heating and/or stirring apparatus of the present invention.

Alternatively as shown in FIG. 10 pipe 87 is continuously advanced under a bottom nozzle in main containment vessel 78 so that the pipe is coated with zinc dropping through bottom nozzle 78b (with stopper rod 78a flow control) into lower zinc collection vessel 79. One or more submersible induction heating and/or stirring apparatus of the present invention may be used in the main containment vessel and/or the lower zinc collection vessel. For example as shown in FIG. 10 apparatus 10 is used in both main containment vessel 78 and lower zinc collection vessel 79.

In addition to removable applications where the induction heating and stirring apparatus may be portable and selectively dropped into, and removed from, the molten metal containment vessel, the apparatus may be permanently installed, or semi-permanently installed, in the containment vessel, or in a removable lid associated with the containment vessel, for example, when the vessel of hot molten metal is held for future use.

Bundles of litz wire may be used as the induction coil, with or without additional cooling in other examples of the invention.

While the induction coils in some of the above examples of the invention are generally spirally-wound within a refractory other physical configurations may be used. For example one or more induction coils may be arranged in an overall rectangular configuration within an embedding refractory.

In a particular application the arrangement of one or more induction coils and supply of single or multiphase current(s) to the one or more coils can be provided to achieve any desired electromagnetic stirring effect of the electrically conductive material in which an electric induction heating and stirring apparatus of the present invention is submerged. For example low power unidirectional stirring can be achieved by artificially reflecting a low load (impedance of the one or more induction coils) power factor to the power source supplying current to the induction heating and stirring apparatus, which results in high reactive currents that create large electromagnetic forces in the material with low induced heating of the material. Consequently this high stir/low heat process is of advantage in process applications that require high fluidity of the material without temperature rise of the material or with heat (energy) removal from the material.

Flux concentrators may be utilized in any example of the invention to concentrate magnetic flux in the direction of molten metal that is to be inductively heated and/or stirred.

Depending upon the particular industrial application of the apparatus of the present invention the refractory or coating may also be used to support other process functions. For example if the application requires bubbling of a gas through the molten material to remove impurities from the molten material, one or more flow passages (as shown for example as flow passage 68 in FIG. 3(*h*)) may be formed within the refractory for example refractory 24 in FIG. 3(*h*)) for supply of the gas into the molten metal when the heating apparatus is submerged in the molten metal. The flow passage can have an exit opening (for example exit opening 68*a* in FIG. 3(*h*)) submerged in the electrically conductive composition, and a non-submerged entry opening for example entry opening 68*b* in FIG. 3(*h*)) when the apparatus is lowered into the electrically conductive composition. The non-submerged entry opening can be connected to a fluid or gas supply (for example supply 67 in FIG. 3(*h*)) for injection of a fluid or gas into the electrically conductive composition through the one or more flow passages. One or more electrical resistance elements (for example electrical resistance element 66 in FIG. 3(*h*)) may be embedded in the refractory (for example refractory 24 in FIG. 3(*h*)) of an induction heating and stirring apparatus of the present invention so that low power resistive heating can augment high power induction heating from a suitable source of electric power (for example electric power source 66*a* in FIG. 3(*h*)). For example, only low power resistive heating may be required when a container of electrically conductive material is being held in a covered vessel as shown in FIG. 7(*a*) and FIG. 7(*b*) and described above. Alternatively if the apparatus of the present invention includes cooling passages, either with the one or more induction coils, or embedded in the refractory, the submerged apparatus may be used as a heat sink to draw heat from the electrically conductive material in which the apparatus is submerged by circulating a liquid or gas cooling medium through the cooling passages while no current is supplied to the one or more induction coils.

The electric induction heating and/or melting apparatus and process of the present invention may be utilized in other applications where there is a need to keep a contained volume of an electrically conductive material at a desired temperature. By way of example and not limitation, the containment vessel may be an induction metal melting furnace, molten metal holding ladle, or tundish for controlled filling of sequential molds from the tundish by suitable controlled pouring apparatus. Further the containment vessel may be open to atmosphere or subject to a vacuum or other controlled environment.

The terms "electrically conductive material," "composition," "metal" and "alloy" are all use herein interchangeably and without intent of limiting a particular use of one of these terms herein.

The present invention has been described in terms of preferred examples and embodiments. Equivalents, alternatives and modifications, aside from those expressly stated, are possible and within the scope of the invention.

The invention claimed is:

1. An apparatus for inductively heating and stirring an electrically conductive composition deposited in a containment vessel in a molten state, the apparatus comprising:
   a submersible inductor assembly comprising:
      at least two electrically interconnected induction coil sections, the at least two electrically interconnected induction coil sections spaced apart from each other to form a gap;
      a refractory surrounding at least the surfaces of the at least two electrically interconnected induction coil sections below an inductor submersion level, the refractory forming:
         an internal flow passage in the gap for the electrically conductive composition;
         an at least one inlet passage for the electrically conductive composition, the at least one inlet passage in communication with the internal flow passage; and
         an at least one outlet passage for the electrically conductive composition;
   at least one alternating current power source connected to the at least two electrically interconnected induction coil sections to electromagnetically force the electrically conductive composition by a transverse flux through the internal flow passage from the at least one inlet passage to the at least one outlet passage when the submersible inductor is submersed in the containment vessel to the inductor submersion level; and
   a transport apparatus for engaging the inductor assembly, the transport apparatus comprising at least a means for lowering and raising the submersible inductor assembly to the inductor submersion level.

2. The apparatus of claim 1 further comprising one or more cooling passages formed in the at least two electrically interconnected induction coil sections or the refractory.

3. The apparatus of claim 1 wherein the transport apparatus further comprises a lock and release mechanism for engaging or disengaging the submersible inductor assembly when the submersible inductor assembly is in the containment vessel at the inductor submersion level.

4. The apparatus of claim 1 wherein the transport apparatus further comprises a submersible inductor assembly translation or rotation subassembly for translating or rotating when the submersible inductor assembly is lowered into the electrically conductive composition.

5. The apparatus of claim 1 wherein at least two electrically interconnected induction coil sections is formed from litz wire.

6. The apparatus of claim 1 further comprising at least one passage within the refractory, the at least one passage having an exit opening submerged in the electrically conductive composition and a non-submerged entry opening when the submersible inductor assembly is lowered into the electrically conductive composition, the non-submerged entry opening connected to a fluid or a gas supply for injecting a fluid or a gas into the electrically conductive composition through the at least one passage.

7. The apparatus of claim 1 further comprising:
at least one resistive heating element embedded in the refractory; and
at least one source of electric power connected to the at least one resistive heating element.

8. The apparatus of claim 1 wherein the internal flow passage comprises a series of interconnected flow channels formed between the at least two electrically interconnected induction coil sections.

9. The apparatus of claim 1 wherein each of the at least two electrically interconnected induction coil sections are spiral coil sections connected electrically in series, the spiral coil sections planarly spaced apart from each other to form the gap.

10. The apparatus of claim 9 wherein the at least one inlet passage is centrally located on at least one side refractory of the submersible inductor assembly and the at least one outlet passage is planarly oriented with the internal flow passage in the gap.

11. The apparatus of claim 10 further comprising a magnetic core formed around the at least one inlet passage.

* * * * *